Patented June 9, 1953

2,641,605

UNITED STATES PATENT OFFICE 2,641,605

TRIORGANOSILYLBENZALDEHYDES

Kurt C. Frisch and Phiroze D. Shroff, Pittsfield, Mass., assignors to General Electric Company, a corporation of New York No Drawing. Application May 15, 1952, Serial No. 288,037

5 Claims. (Cl. 260—448.2)

This invention is concerned with novel organosilicon composition. More particularly, the invention relates to triorganosilylbenzaldehydes of the general formula

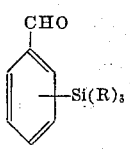

where R is the same or different monovalent hydrocarbon radicals. The compositions herein described are valuable chemical intermediates for the preparation of silicon-containing dyes, medicinals, and insecticides.

Among the values for which R may stand are, for instance, alkyl radicals (e. g., methyl, ethyl, propyl, isopropyl, butyl, decyl, etc.), aryl radicals (e. g., phenyl, naphthyl, biphenyl, etc.), aralkyl radicals (e. g., benzyl, phenylethyl, etc.), alkaryl radicals (e. g., tolyl, xylyl, ethylphenyl, etc.), cycloaliphatic radicals (e. g., cyclohexane, cyclopentane, cyclohexene, etc.), as well as monohydrocarbon radicals containing substituents thereon which are inert, for instance, halogens, such as chlorine, bromine, fluorine, etc.

The compounds herein disclosed and claimed may advantageously be prepared by effecting reaction between a Grignard reagent of the general formula

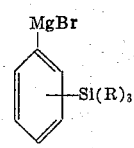

where R has the meaning given above, and ethylorthoformate having the formula $HC(OC_2H_5)_3$, which will give the acetal having the formula

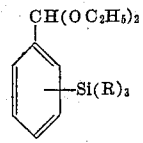

which can be readily hydrolyzed to give compounds of the formula

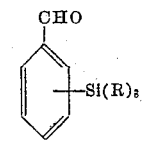

In order that those skilled in the art may better understand how the present invention may be practiced, the following examples are given by way of illustration and not by way of limitation.

*Example 1*

A Grignard solution was prepared by adding about 62.1 grams of para-bromophenyltrimethylsilane and magnesium to diethyl ether. This Grignard solution which contained the Grignard reagent having the formula

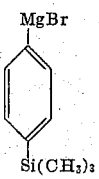

was then mixed with a solution of 40.2 grams ethylorthoformate in 100 cc. diethyl ether. This mixture was refluxed for 14 hours, and the reaction product thereafter extracted several times with diethyl ether and the ether solvent removed. The residual brown solid mass was ground into a fine powder and added slowly to 750 cc. of a 6% aqueous HCl solution which was maintained at a temperature of about 0° to 5° C. by means of an ice bath. After all the powder had been dissolved, the mixture was stirred for 4 hours, during which time the temperature was permitted to rise to room temperature. The mixture was then ether extracted with diethyl ether, and again the solvent removed. The residual material (the acetal) thus obtained was decomposed by adding it to 700 cc. of an aqueous solution containing 100 grams of concentrated sulfuric acid. The mixture was refluxed for 15 minutes and fractionally distilled to remove the low boiling material. The residual liquid was steam distilled and the distillate thus obtained was ether extracted and the ether thereafter removed to give a solid product which when recrystallized from ligroin had a melting point of 109–110° C. and was in the form of colorless needles. This composition, which was para-trimethylsilylbenzaldehyde, had a boiling point of 119° C. at 15 mm. Analysis of this composition showed it to contain 15.9 percent silicon (theoretical 15.73 percent silicon). Infrared analysis showed the presence of carbonyl, phenyl, Si—CH₃ and Si—C groupings.

The identity of this compound was further established by preparing the 2,4-dinitrophenylhydrazone derivative as follows: A sample of the aforesaid aldehyde was dissolved in 155 cc. of 95% ethanol. A solution of 0.4 gram of 2,4-dinitrophenylhydrazine, in 2 cc. of concentrated sulfuric acid, 3 cc. of water, and 10 cc. of 95% ethanol was added. A reddish-orange precipitate of the hydrazone formed immediately. The precipitate was filtered and recrystallized from alcohol and ethyl acetate to give a product having a melting point of 209° C. Infrared spectra showed the N—H, Si—CH₃, Si—C, —NO₂, N=C, and phenyl groups and linkages, accounting for the structure

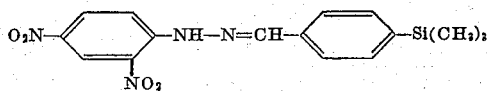

Example 2

The compound para-triphenylsilylbenzaldehyde may be prepared in the same way as that described for making para-trimethylsilylbenzaldehyde by employing para-bromophenyltriphenylsilane in place of the para-bromophenyltrimethylsilane used in Example 1. The same procedure is used as that described in Example 1 to give the compound para-triphenylsilylbenzaldehyde having the formula

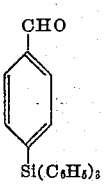

It will of course be apparent to those skilled in the art that the triorganosilyl group may be attached to other points of the phenyl nucleus, for instance, instead of being in the para position, it may be in the ortho or meta positions. Moreover, the organic groups positioned around the silicon atom may also be varied widely, in accordance with the various values for which R stands. R, of course, may be different organic radicals, as for instance the monovalent hydrocarbon radicals around the silicon atom may consist of one methyl group and two ethyl groups, or one methyl group and two phenyl groups, etc. We do not intend to be limited to the type of organic groups around the silicon atom, nor to the position on the benzene nucleus to which the silicon atom is attached.

In addition to the uses described above for the compositions herein disclosed and claimed, the triorganosilylbenzaldehyde may also be condensed with phenols, or used as a modifying agent in the preparation of phenol-formaldehyde resinous compositions to import plasticity to resinous compositions prepared from such mixtures. It should be pointed out that it is possible to prepare other derivatives of the compounds hereindescribed, wherein R in addition to being a monovalent hydrocarbon radical may also be a halogen. Thus, compounds of the type

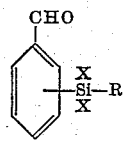

where R has the meaning given above and X is a halogen are also contemplated. Such types of compositions may be hydrolyzed to give polymeric materials having the recurring structural unit

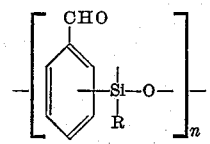

where n is an integer equal to at least 1.

What we claim as new and desire to secure by Letters Patent of the United States is:

1. A composition of matter comprising a compound having the general formula

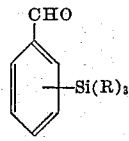

where R is a monovalent hydrocarbon radical selected from the class consisting of alkyl, aryl, aralkyl, alkaryl, cycloalkyl and cycloalkene radicals.

2. The chemical compound para-trimethylsilylbenzaldehyde.

3. The chemical compound para-triphenylsilylbenzaldehyde.

4. The process for making a composition of matter having the general formula

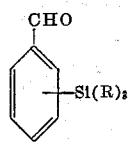

which comprises effecting reaction between a compound having the general formula

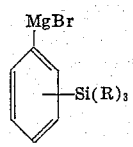

and ethylorthoformate, to obtain a compound having the general formula

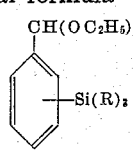

and thereafter hydrolyzing the latter compound to obtain the desired composition, where R in the aforementioned formulae is a monovalent hydrocarbon radical selected from the class consisting of alkyl, aryl, aralkyl, alkaryl, cycloalkyl and cycloalkene radicals.

5. The process which comprises (1) effecting reaction between a compound having the formula

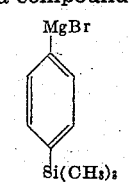

and ethylorthoformate to obtain the compound

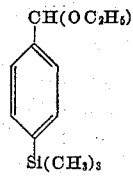

and (2) thereafter hydrolyzing the latter compound to give para-trimethylsilylbenzaldehyde.

KURT C. FRISCH.
PHIROZE D. SHROFF.

References Cited in the file of this patent

Post, "The Chemistry of Aliphatic Ortho Esters," 1943, pages 96–100, Reinhold, publisher, New York.